(12) United States Patent
Minami (10) Patent No.: US 12,030,752 B2
(45) Date of Patent: Jul. 9, 2024

(54) CRANE CONTROL METHOD, AND CRANE

(71) Applicant: TADANO LTD., Kagawa (JP)

(72) Inventor: Yoshimasa Minami, Kagawa (JP)

(73) Assignee: TADANO LTD., Kagawa (JP)

(*) Notice: Subject to any disclaimer, the term of this patent is extended or adjusted under 35 U.S.C. 154(b) by 495 days.

(21) Appl. No.: 17/423,356

(22) PCT Filed: Mar. 27, 2020

(86) PCT No.: PCT/JP2020/013904
§ 371 (c)(1),
(2) Date: Jul. 15, 2021

(87) PCT Pub. No.: WO2020/196808
PCT Pub. Date: Oct. 1, 2020

(65) Prior Publication Data
US 2022/0127116 A1     Apr. 28, 2022

(30) Foreign Application Priority Data

Mar. 27, 2019   (JP) ................................. 2019-061192

(51) Int. Cl.
*G05G 1/10*    (2006.01)
*B66C 13/48*   (2006.01)
*G05D 1/00*    (2006.01)

(52) U.S. Cl.
CPC .............. *B66C 13/48* (2013.01); *G05D 1/10* (2013.01)

(58) Field of Classification Search
CPC .... G01R 19/2513; G01R 31/085; H02G 1/02; G05D 1/104; G01S 5/02213;
(Continued)

(56) References Cited

U.S. PATENT DOCUMENTS

| 5,960,969 A | 10/1999 | Habisohn |
| 7,677,337 B2* | 3/2010 | Poeckl ............ E21B 7/02 175/162 |

(Continued)

FOREIGN PATENT DOCUMENTS

| CN | 101281391 A | 10/2008 |
| JP | 2018-030692 A | 3/2018 |

OTHER PUBLICATIONS

Wada et al., Development of practical application for sensorless crane control system, 2017, IEEE, p. 1320-1325 (Year: 2017).*

(Continued)

*Primary Examiner* — McDieunel Marc
(74) *Attorney, Agent, or Firm* — Paratus Law Group, PLLC (57) ABSTRACT

There is provided a crane control method whereby shaking of a load is suppressed when automatically transporting the load along a set transport path using a crane; and a crane that is controllable by this control method. The control method includes: calculating a target transport time (Ti) of a load (W), transported by a crane (1), in a section defined by two passing points adjacent in a passing order; calculating, from a distance between the passing points and the target transport time (Ti), a target speed signal of the load (W) in the section; converting a stepped target speed signal, which connects the target speed signal of the section and a target speed signal of another section adjacent to the section, to a non-stepped target speed signal using a target value filter (F); and carrying out control on the basis of the non-stepped target speed signal.

10 Claims, 6 Drawing Sheets

(58) Field of Classification Search
CPC ...... G01S 5/0249; G01S 5/06; G01S 2205/03; B64U 80/25; B64U 2201/104; B64U 2101/30; B64U 2101/26; G05G 1/10
See application file for complete search history.

(56) References Cited

U.S. PATENT DOCUMENTS

| | | | | |
|---|---|---|---|---|
| 8,908,090 | B2* | 12/2014 | Webb | H04N 23/6812 348/373 |
| 8,934,023 | B2* | 1/2015 | Webb | H04N 23/6812 348/208.99 |
| 8,938,161 | B2* | 1/2015 | Webb | H04N 23/6812 396/421 |
| 10,298,846 | B2* | 5/2019 | Webb | H04N 23/54 |
| 11,874,679 | B2* | 1/2024 | Saito | G05B 23/0254 |
| 2013/0245816 | A1 | 9/2013 | Langer et al. | |

OTHER PUBLICATIONS

Osumi et al., Development of tele-operation system for a crane without overshoot in positioning, 2010, IEEE, p. 5799-5805 (Year: 2010).*
Luo et al., Research of Bridge Crane Hoist Control System with Skew Controller, 2018, IEEE, p. 1-4 (Year: 2018).*
Hyla, The crane control systems: A survey, 2012, IEEE, p. 505-509 (Year: 2012).*
Jun. 23, 2020, International Search Report issued for related PCT application No. PCT/JP2020/013904.
Jun. 23, 2020, International Search Opinion issued for related PCT application No. PCT/JP2020/013904.
Nov. 30, 2022, European Search Report issued for related EP Application No. 20779973.5.

* cited by examiner

CRANE CONTROL METHOD, AND CRANE

CROSS REFERENCE TO PRIOR APPLICATION

This application is a National Stage Patent Application of PCT International Patent Application No. PCT/JP2020/013904 (filed on Mar. 27, 2020) under 35 U.S.C. § 371, which claims priority to Japanese Patent Application No. 2019-061192 (filed on Mar. 27, 2019), which are all hereby incorporated by reference in their entirety.

TECHNICAL FIELD

The present invention relates to a crane control method and a crane that can be controlled by the control method.

BACKGROUND ART

Conventionally, for a crane, a technique of conveying a lifted load to a desired installation position along a set path through automated driving is known as disclosed in PTL 1, for example.

When a load is conveyed through automated driving using the crane disclosed in PTL 1, it is necessary to suppress load swing during the conveyance of the load. However, a known crane adopts a method in which load swing is detected and controlled when load swing is caused (so-called feedback-control (hereinafter referred to as FB control)), and as such it is difficult to perform control without causing load swing.

CITATION LIST

Patent Literature

PTL 1
  Japanese Patent Application Laid-Open No. 2018-030692

SUMMARY OF INVENTION

Technical Problem

An object of the present invention is to provide a crane control method that can suppress load swing of a load when the load is automatically conveyed along a set conveyance path using a crane, and a crane that can be controlled by the control method.

Solution to Problem

Problems to be solved by the present invention are as described above, and the solutions to solve the problems are described next.

A crane control method according to the embodiment of the embodiment of the present invention uses a crane whose operation is controlled by a control apparatus to automatically convey a load along a conveyance path given as point group data including at least coordinates of a passing point of the load and a passage order of each passing point, the method including: by the crane, calculating a target conveyance time of the load in a section defined by two passing points adjacent to each other in the passage order; calculating a target speed signal of the load in the section on a basis of a distance between the two passing points and the target conveyance time that is calculated; and converting, into a non-stepwise target speed signal, a stepwise target speed signal connecting the target speed signal of the section and the target speed signal of another section adjacent to the section through a use of a target value filter to control the crane on a basis of the non-stepwise target speed signal.

In the crane control method according to the embodiment of the embodiment of the present invention, by the control apparatus, the section is subdivided into a control section including an acceleration section, a constant-speed section, and a deceleration section, and the non-stepwise target speed signal is generated in the acceleration section and the deceleration section.

In the crane control method according to the embodiment of the embodiment of the present invention, a data set including at least a target conveyance time of the control section and information representing the target value filter suitable for the control section is created by the control apparatus for the control section.

In the crane control method according to the embodiment of the embodiment of the present invention, the data set is created by the control apparatus before a control of automatically conveying the load is started.

In the crane control method according to the embodiment of the embodiment of the present invention, the target value filter is a high-order low-pass filter based on an inverse dynamics model.

A crane comprising a control apparatus configured to perform the crane control method.

Advantageous Effects of Invention

The present invention provides the following effects.

The crane control method and the crane according to the embodiment of the present invention can suppress load swing of a load when the load is automatically conveyed along a set conveyance path.

DESCRIPTION OF EMBODIMENTS

General Configuration of Crane

Crane 1 serving as a crane (rough terrane crane) according to an embodiment of the present invention is described below with reference to FIGS. 1 and 2. It is to be noted that a rough terrane crane is described as an example in the present embodiment, but the crane according to the embodiment of the present invention may be mobile cranes of other types such as all terrane cranes, truck cranes and loading truck cranes, and stationary cranes such as ceiling cranes.

Crane 1 is composed of vehicle 2 and crane apparatus 6.

Vehicle 2 includes pairs of left and right front wheels 3 and rear wheels 4. In addition, vehicle 2 includes outrigger 5 that is grounded fir the purpose of stabilization when a task of conveying load W is performed. Note that vehicle 2 supports crane apparatus 6 on its top.

Crane apparatus 6 is an apparatus for lifting load W using a wire rope. Crane apparatus 6 includes slewing platform 8, boom 9, main hook block 10, sub hook block 11, main winch 13, main wire rope 14, sub winch 15, sub wire rope 16, cabin 17 and the like.

Slewing platform 8 is a structure configured to be capable of slewing crane apparatus 6. Slewing platform 8 is provided on a frame of vehicle 2 with an annular bearing therebetween. Slewing platform 8 is provided with slewing hydraulic motor 81 that is an actuator. Slewing platform 8 is configured to be slewed in the horizontal direction by slewing hydraulic motor 81.

Slewing hydraulic motor 81 is operated and rotated by slewing valve 22 that is an electromagnetic proportional switching valve. Slewing valve 22 can control, to any flow rate, the flow rate of the operation oil that is supplied to slewing hydraulic motor 81. That is, slowing platform 8 is configured to be controllable at any slewing speed through slewing hydraulic motor 81 rotated and operated by slewing valve 22. Slewing platform 8 is provided with slewing sensor 27 that detects the slewing angle and slewing speed of slewing platform 8.

Boom 9 is a structure configured to be capable of lifting load W. The base end of boom 9 is provided in a swayable manner at an approximate center of slewing platform 8. Boom 9 is provided with luffing hydraulic cylinder 92 and telescoping hydraulic cylinder 91, as an actuator. Boom 9 is configured to be extendable in the longitudinal direction with telescoping hydraulic cylinder 91. In addition, boom 9 is configured to be capable of luffing in the vertical direction with luffing hydraulic cylinder 92. Further, boom 9 is provided with boom camera 93.

Telescoping hydraulic cylinder 91 is telescopically operated by telescoping valve 23 that is an electromagnetic proportional switching valve. Telescoping valve 23 can control, to any flow rate, the flow rate of the operation oil that is supplied to telescoping hydraulic cylinder 91. That is, boom 9 is configured to be controllable at any telescoping speed through telescoping hydraulic cylinder 91 telescopically operated by telescoping valve 23. Boom 9 is provided with telescoping sensor 28 that detects the boom length and telescoping speed of boom 9.

Luffing hydraulic cylinder 92 is telescopically operated by luffing valve 24 that is an electromagnetic proportional switching valve. Lulling valve 24 can control, to any flow rate, the flow rate of the operation oil that is supplied to lulling hydraulic cylinder 92. That is, boom 9 is configured to be controllable at any lulling speed through luffing hydraulic cylinder 92 that is telescopically operated by lulling valve 24. Boom 9 is provided with luffing sensor 29 that detects the lulling angle and luffing speed of boom 9.

Boom camera 93 acquires images of load W, ground objects and the like. Boom camera 93 is provided at an end portion of boom 9. In addition, boom camera 93 is configured to be rotatable 360 degrees, and can capture 360 degrees around an end portion of boom 9. Note that boom camera 93 is connected to control apparatus 32 described later.

Main hook block 10 and sub hook block 11 are members for lifting load W. Main hook block 10 is provided with main hook 10a. Sub hook block 11 is provided with sub hook 11a.

Main winch 13 and main wire rope 14 are mechanisms for lifting load W hooked on main hook 10a. In addition, sub winch 15 and sub wire rope 16 are mechanisms for lifting load W hooked on sub hook 11a. Main winch 13 and sub winch 15 are provided with winding sensor 26 that detects their respective rotation amounts. Main winch 13 is configured to be operated at given feed-in and feed-out speeds by controlling the main-hydraulic motor by main valve 25$m$ that is an electromagnetic proportional switching valve. Likewise, sub winch 15 is configured to be operated at given feed-in and feed-out speeds by controlling the sub-hydraulic motor by sub valve 25$s$ that is an electromagnetic proportional switching valve.

Figure 1:
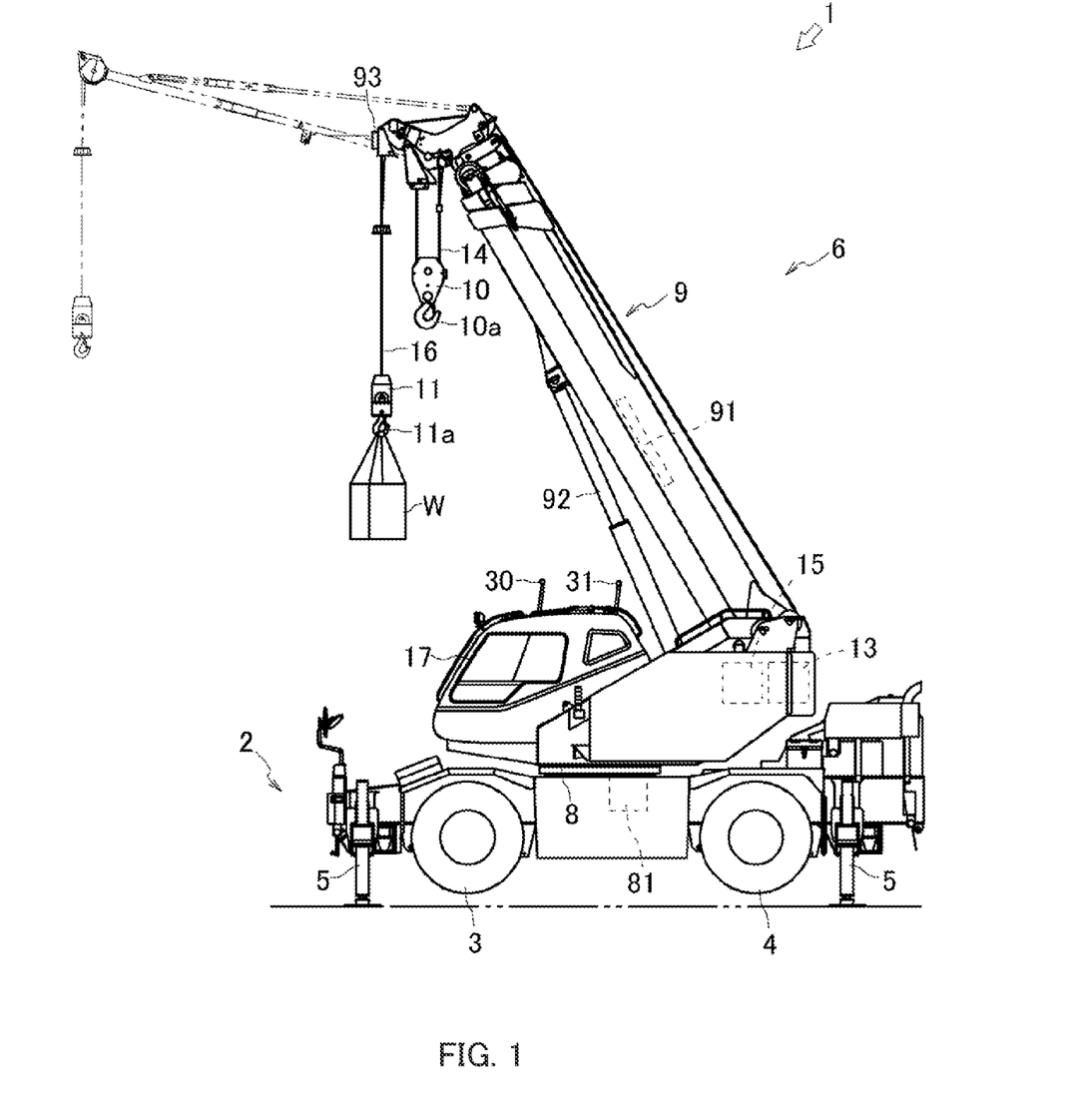
FIG. 1 is a side view illustrating a general configuration of a crane.
Figure 2:
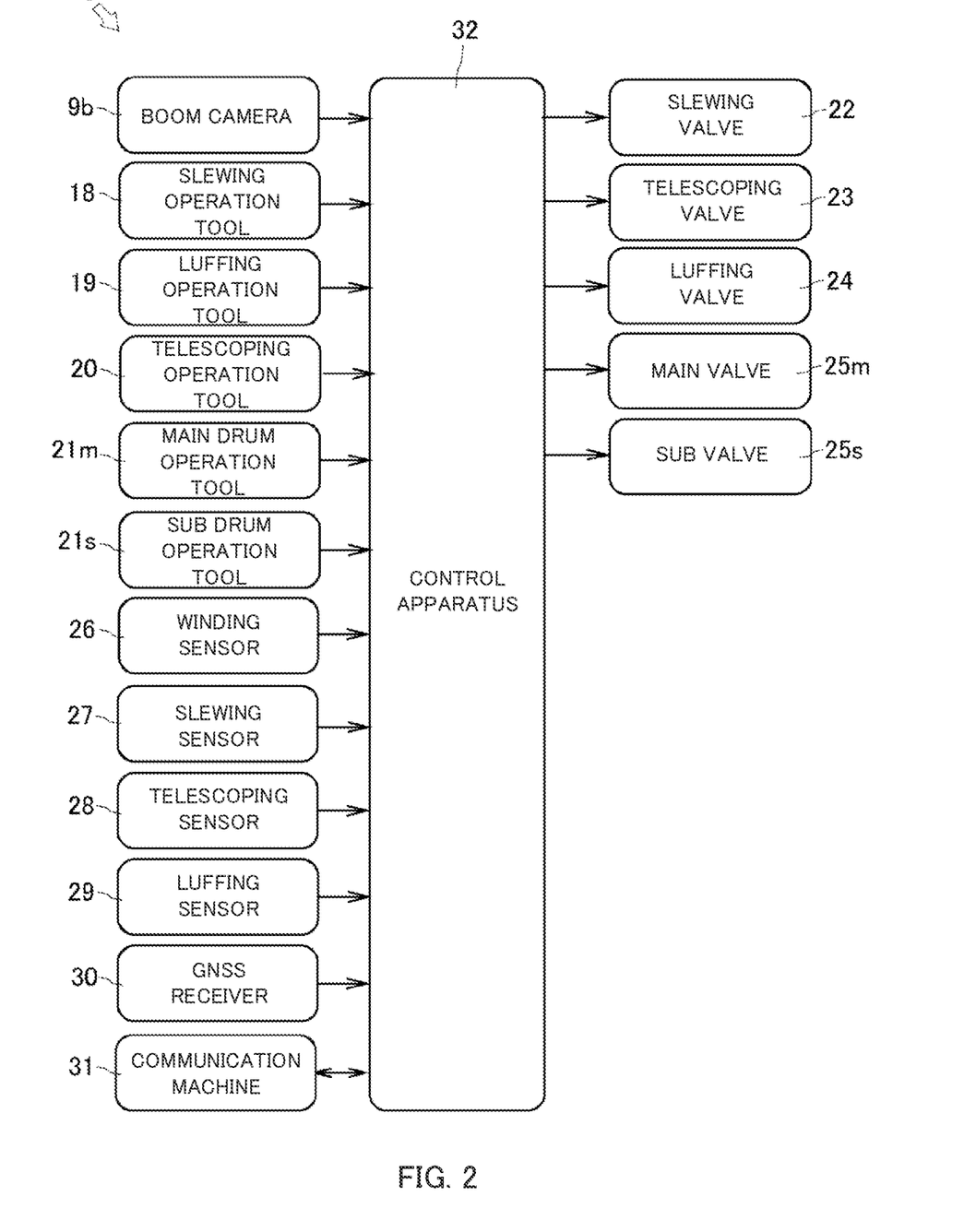
FIG. 2 is a block diagram illustrating a control configuration of an entirety of a crane.

Note that while an exemplary case where load W hooked on sub hook 11a is lifted by sub winch 15 and sub wire rope 16 as illustrated in FIG. 1 is described below, the crane control method according to the embodiment of the present invention is also applicable to a case where load W hooked on main hook 10a is lifted by main winch 13 and main wire rope 14, and therefore the description tier the case using main hook 10a is appropriately omitted.

Cabin 17 is a structure that covers the operation seat. An operation tool for operating vehicle 2 and an operation tool for operating crane apparatus 6 are provided in cabin 17. Slewing operation tool 18 can operate slewing hydraulic motor 81. Luffing operation tool 19 can operate lulling hydraulic cylinder 92. Telescoping operation tool 20 can operate telescoping hydraulic cylinder 91. Main drum operation tool 21$m$ can operate the main-hydraulic motor. Sub drum operation tool 21$s$ can operate the sub-hydraulic motor.

GNSS receiver 30 receives a distance measurement radio wave from a satellite to calculate the latitude, longitude, and altitude. GNSS receiver 30 is provided in cabin 17. Thus, crane 1 can acquire the position coordinates of cabin 17. In addition, it is possible to acquire the orientation with reference to vehicle 2. Note that GNSS receiver 30 is connected to control apparatus 32 described later.

Communication machine 31 is an apparatus that communicates with an external server computer. Communication machine 31 is provided in cabin 17. Communication machine 31 is configured to acquire path information described later and the like from the external server computer. Note that communication machine 31 is connected to control apparatus 32 described later. Note that while a configuration in which path information is acquired from the external server computer is described in the present embodiment, the path information may be stored in a storage apparatus provided in crane 1 such that control apparatus 32 can acquire the path information without going through communication machine 31.

Control apparatus 32 controls each actuator of crane 1 through each operating valve. Control apparatus 32 is provided in cabin 17. Practically, control apparatus 35 may have a configuration in which a CPU, ROM, RAM, HDD and the like are connected through a bus, or a configuration composed of one chip LSI or the like.

Control apparatus 32 is a computer that controls various switching valves (slewing valve 22, telescoping valve 23, luffing valve 24, main valve 25$m$ and sub valve 25$s$). Control apparatus 32 stores various programs and data for controlling the various switching valves (22, 23, 24, 25 m and 25s). In addition, control apparatus 32 is connected to various sensors (winding sensor 26, slewing sensor 27, telescoping sensor 28 and luffing sensor 29). Further, control apparatus 32 is connected to various operation tools (slewing operation tool 18, luffing operation tool 19, telescoping operation tool 20, main drum operation tool 21m and sub drum operation tool 21s). Thus, control apparatus 32 can generate a control signal corresponding to the amount of operation of the various operation tools (18, 19, 20, 21m and 21s).

In addition, when performing automatic conveyance by crane 1, control apparatus 32 can generate control signals for controlling the various switching valves (slowing valve 22, telescoping valve 23, luffing valve 24, main valve 25m and sub valve 25s) on the basis of given path information.

Crane 1 having the above-mentioned configuration can move crane apparatus 6 to any position by running vehicle 2. In addition, crane 1 can increase the lifting height and operational radius of crane apparatus 6 by raising and extending boom 9. Further, crane 1 can move load W by using movements such as the slewing, luffing and telescoping of boom 9, winding up of sub wire rope 16 and the like alone or in combination.

Specific Configuration of Control Apparatus

Figure 3:
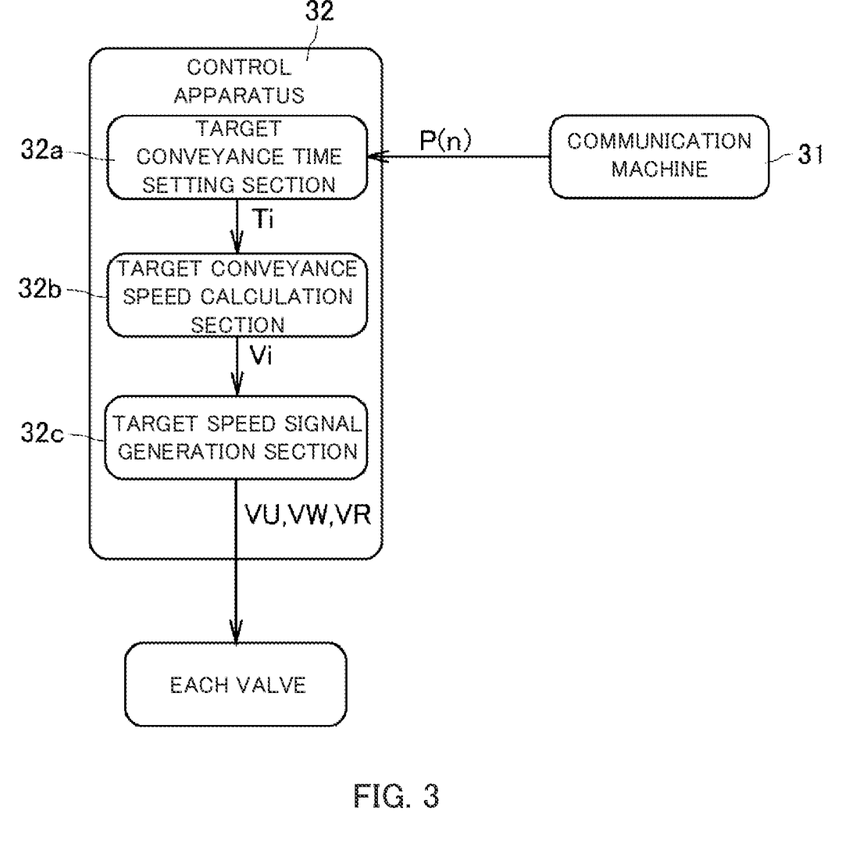
FIG. 3 is a block diagram illustrating a configuration of a control apparatus.

Control apparatus 32 includes target conveyance time setting section 32a, target conveyance speed calculation section 32b, and target speed signal generation section 32c.

Target conveyance time setting section 32a is a part of control apparatus 32, and sets target conveyance time Ti for each section.

Target conveyance speed calculation section 32b is a part of control apparatus 32, and calculates target conveyance speed Vi on the basis of calculated target conveyance time Ti of each section and the moving length of load W in each section.

Target speed signal generation section 32c, is a part of control apparatus 32, and generates target speed signal VU in the luffing direction of boom 9, target speed signal VR in the slewing direction, and target speed signal VW in the feed-in and feed-out direction of sub wire rope 16 in conveyance of load W in each section on the basis of calculated target conveyance speed Vi of each section.

In addition, in the case where the section to be calculated is the acceleration section or the deceleration section described later, target speed signal generation section 32c modifies the target speed signal by further applying a filter (target value filter F described later) to the generated target speed signal.

Note that control apparatus 32 can detect the current position of load W by processing an image captured with boom camera 93, or detect the current position of load W on the basis of location information received by GNSS receiver 30.

Procedure of Generation of Target Speed Signal

Next, a generation procedure of the target speed signal in the method of controlling crane 1 is described.

Figure 4:
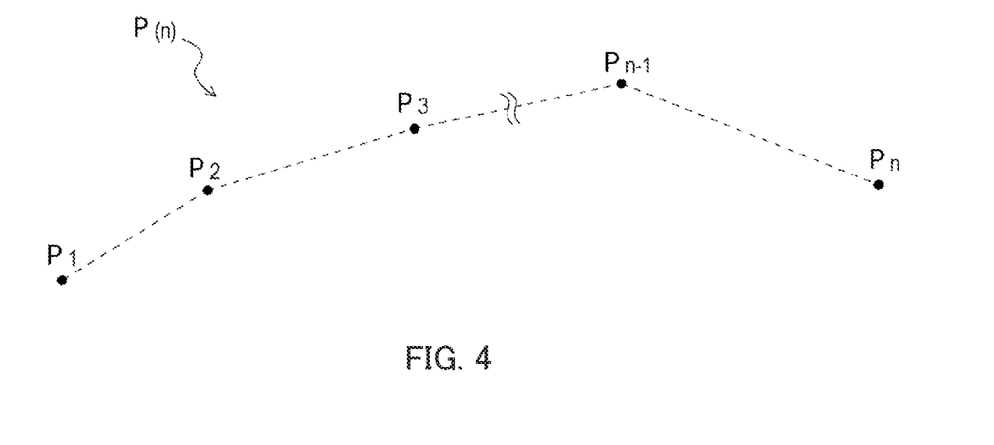
FIG. 4 is a schematic view illustrating point group data given as path information.

Path information of load W given to crane 1 is generated in the form of point group data P(n) (n is a natural number) as illustrated in FIG. 4 by a separately prepared path information generation means. In the present embodiment, the path information generation means is an external server, and point group data P(n) serving as path information is taken into control apparatus 32 of crane 1 through communication machine 31 that communicates with the external server (see FIG. 2).

As illustrated in FIG. 4, point group data P(n) is information composed of n nodes (points), and each node includes information about the coordinates of the passing point of load W. Numbers attached to the nodes indicate the passage order of the nodes. Specifically, node P1 is the coordinate data of the first passing point of load W, and node Pn is the coordinate data of the nth (last) passing point of load W. As the position of load W, for example, the coordinates of the gravity center of load W are used.

When point group data P(n) is given, first, control apparatus 32 sets target conveyance time Ti between each node. Note that in the following description, the region between nodes is referred to as section. For example, control apparatus 32 sets target conveyance time Ti by allocating the required conveyance time (the time required for the conveyance from the start point to the end point) desired by the user in consideration of the conveyance distance in each section and the like. Subscript i of the target conveyance time indicates the order of the section (i is a natural number).

After setting target conveyance time Ti of each section, control apparatus 32 calculates target conveyance speed Vi of each section on the basis of target conveyance time Ti. Target conveyance speed Vi calculated here is a value obtained by dividing, the distance between each section by target conveyance time Ti. That is, target conveyance speed Vi corresponds to the average conveyance speed of load W in the section, which is a constant speed in the section.

After calculating target conveyance speed Vi of each section, control apparatus 32 calculates target speed signal VU in the luffing direction of boom 9, target speed signal VR in the slewing direction, and target speed signal VW in the feed-in and feed-out direction of sub wire rope 16 in sub winch 15 on the basis of the target conveyance speed Vi and the crane model. Here, the "target speed signal" is a signal for the request to each actuator for the target speed for displacing boom n the luffing direction and the slewing direction and the target speed for displacing sub wire rope 16 in the feed-in and feed-out direction, and includes information representing each target speed.

Subdivision of Section

Figure 6:
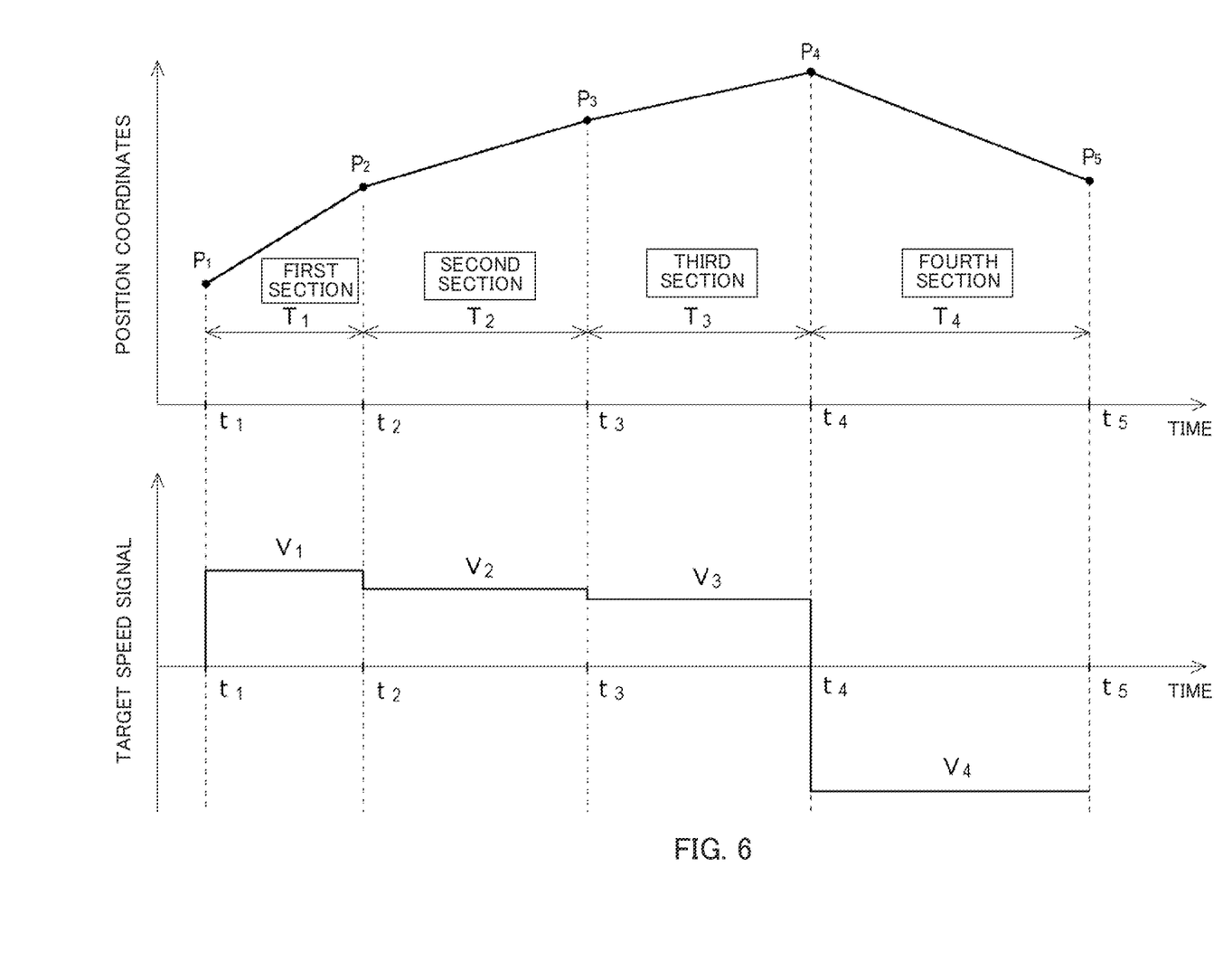
FIG. 6 is a drawing illustrating a relationship between a change in target speed signal and a maximum speed and a setting state of a target conveyance time for each section of a conveyance path in a case where the control method according to the embodiment of the present invention is not used.

When calculated target conveyance speed Vi is converted into a target speed signal as it is, the variation of the target speed signal is linear as illustrated in FIG. 6. Specifically, when there is a difference in target conveyance speed Vi between sections adjacent to each other, the to speed signal changes stepwise at transition of the section. Then, such stepwise change of the target speed signal becomes a factor of swaying load W. Crane 1 reduces the sway of load W during automatic conveyance by eliminating the stepwise change of the target speed signal.

More specifically, in crane 1, control apparatus 32 further appropriately subdivides the set section into an acceleration section, a constant-speed section and a deceleration section.

Figure 5:
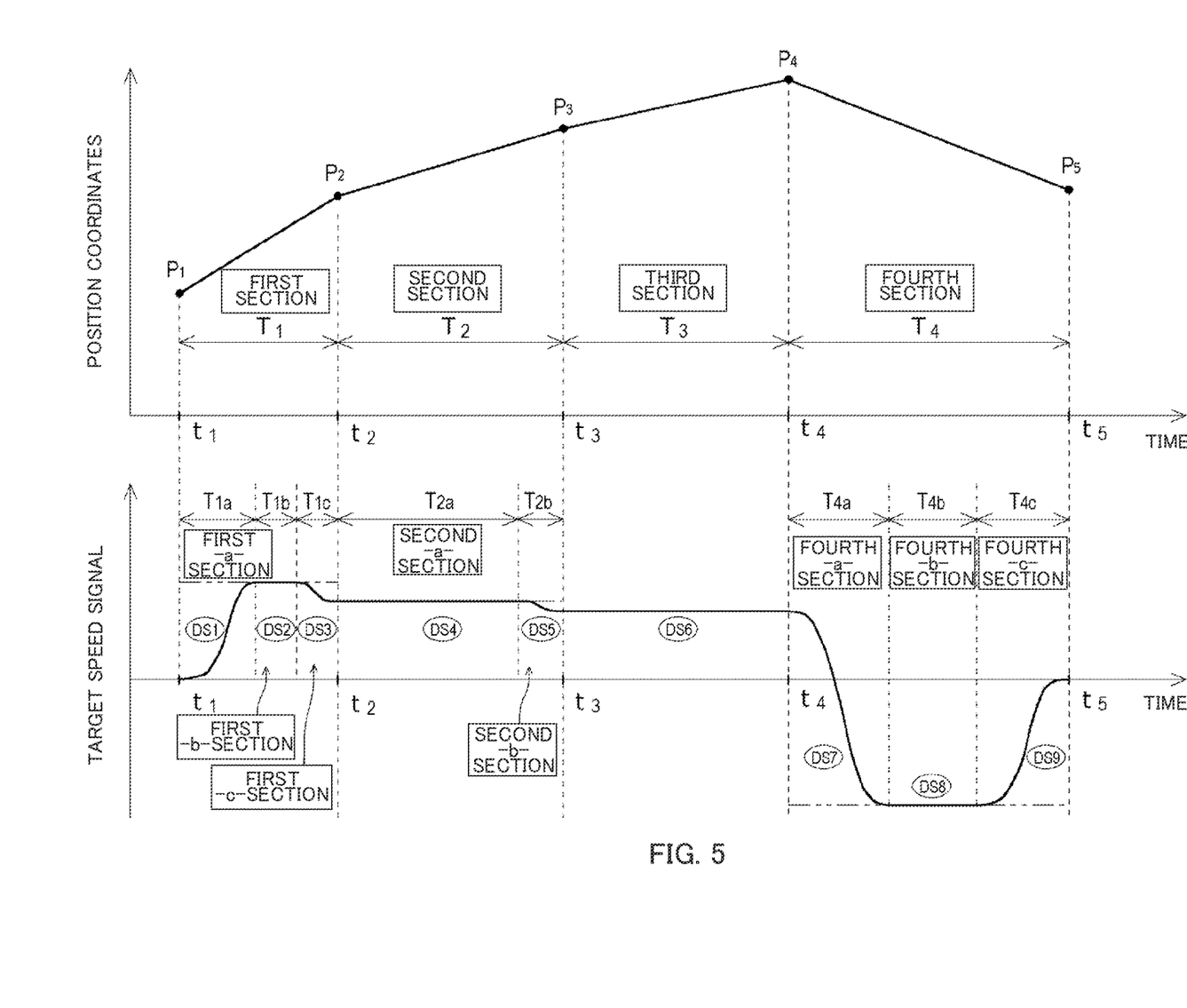
FIG. 5 is a drawing illustrating a relationship between a change in target speed signal and a maximum speed and a setting state of a target conveyance time for each section of a conveyance path in a case where the control method according to the embodiment of the present invention is used.

In the example illustrated in FIG. 5, since, in the first section, the automatic conveyance is started from start point P1 in the state of speed 0, an acceleration section is set for the acceleration at the rise, and target conveyance time T1a of the acceleration section is set. In addition, in the first section, a constant-speed section is set next to the acceleration section, and target conveyance time T1b of the constant-speed section is set. Further, since target conveyance speed V2 of the second section is lower than target conveyance speed V1 of the first section, a deceleration section is set, and target conveyance time T1c of the deceleration section is set.

In addition, since, in the fourth section, target conveyance speed V4 of the fourth section is lower than target conveyance speed V3 of the third section, a deceleration section is set, and target conveyance time T4a of the deceleration section is set. In addition, in the fourth section, a constant-speed section is set next to the deceleration section, and target conveyance time T4b of the constant-speed section is set. Further, since target conveyance speed V5 of a fifth section not illustrated in the drawing is higher than target conveyance speed V1 of the fourth section, an acceleration section is set, and target conveyance time T4c of the acceleration section is set.

Note that a deceleration section corresponding to the deceleration section in the fourth section may be set in the third section. In view of this, comparing the target conveyance time between the third section and the fourth section, it is advantageous to set a longer constant-speed section in the third section, which has a longer conveyance time, in terms of reducing the total conveyance time, and therefore control apparatus 32 provides the deceleration section in the fourth section.

Target Value Filter

Figure 7:
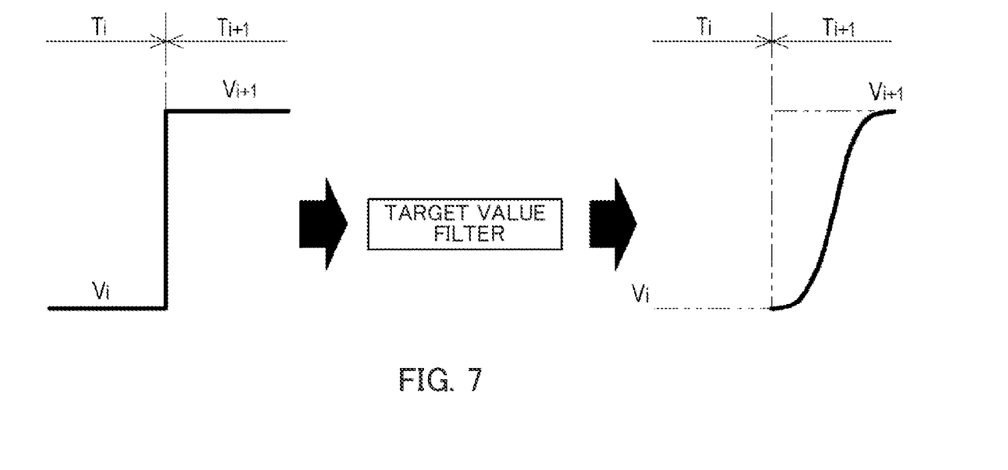
FIG. 7 is a schematic view illustrating a process of a target control signal using a target value filter.

Control apparatus 32 applies target value filter F for the target speed signal that changes stepwise in each acceleration section and each deceleration section set as described above. Target value filter F is a high-order low-pass filter. As illustrated in FIG. 7, when target value filter F is applied, the target speed signal that changes stepwise is converted into a signal having a curved line shape (which, i.e., changes non-stepwise).

As target value filter F, a filter corresponding to the characteristics of each acceleration section and each deceleration section is selected. In addition, in the case where target value filter F is applied for the target speed signal, the target conveyance speed in each acceleration section and each deceleration section is set in consideration of prevention of sway of load W.

As target value filter F to be applied in crane 1, it is preferable to employ a four-order low-pass filter based on the inverse dynamics model, but a two- or three-order low-pass filter may also be employed in accordance with the configuration of crane 1. In addition, through inverse operation using the target speed signal after conversion, it is possible to calculate the time (target conveyance time) required for conveying load W without sway in each acceleration section and each deceleration section. The time required for conveying load W without sway in the acceleration section and deceleration section is calculated first, and then the remaining time can be assigned as the target conveyance time of the constant-speed section. Note that in the case where the initially set target conveyance time is exceeded, the target conveyance time may be extended.

In the case where target value filter F is applied, a response delay is caused and as such the conveyance time tends to be lengthened in comparison with the case where it is not applied. In crane 1, the total time of the acceleration time, deceleration time and constant-speed time is the conveyance time of each section, and control apparatus 32 adjusts the target conveyance speed in the constant-speed section such that the total time does not exceed the target conveyance time. Note that in the case where each actuator has enough capacity, the target conveyance time may be shortened by, for example, further increasing the target conveyance speed in the constant-speed section.

In addition, when target value filter F is applied, the required time to the final position may possibly delayed under the influence of a response delay in comparison with the case where target value filter F is not applied. When target value filter F is applied, however, load swing does not occur, and load W reaching the final position can be immediately placed at a predetermined position. When target value filter F is not applied, on the other hand, load W reaching the final position is swung, and it is necessary to wait until the load swing stops. That is, by applying target value filter F, the time for waiting for stop of load swing is eliminated, and the operation time can be shortened in its entirety.

When the stepwise linear signal at transition of the section is replaced by a linear signal that is converted into a smooth shape by target value filter F, the change of the target speed signal is as illustrated in FIG. 5. The target speed signal becomes a linear signal that smoothly changes as a whole.

Control Flow of First Embodiment

Next, the method of controlling crane 1 is described with reference to a more detailed control flow. Crane 1 can automatically convey load W in accordance with a control flow according to the first embodiment illustrated in FIG. 8A.

Figure 8A:
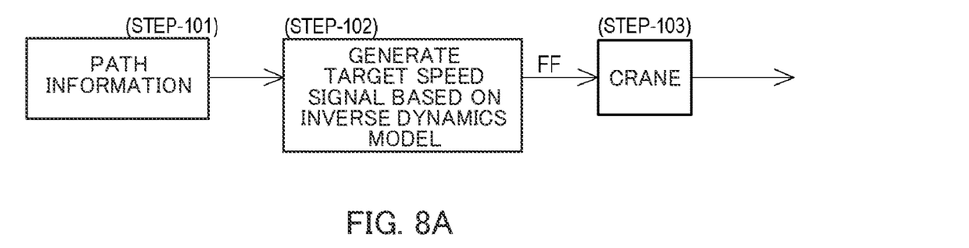
FIGS. 8A and 8B are flowcharts of a control step of a crane of a first embodiment and a second embodiment, respectively.

As illustrated in FIG. 8A, in the method of controlling crane 1, when path information (point group data P(n)) is given (see FIG. 4), control apparatus 32 subdivides the section to set target conveyance time Ti, and further calculates target conveyance speed Vi for each subdivided section (STEP-101). At this time, control apparatus 32 subdivides each section into the constant-speed section, the acceleration section, and the deceleration section. In the following description, each subdivided section is also referred to as control section.

Control apparatus 32 performs different controls for control sections. More specifically, control apparatus 32 sets the target conveyance time for each control section, and calculates the target conveyance speed from the target conveyance time. Further, control apparatus 32 generates the target speed signal in that control section by applying target value filter F based on the inverse dynamics model to the target conveyance speed (STEP-102). Crane 1 can generate a target speed signal that can convey load W without sway by applying target value filter F based on the inverse dynamics model.

At this time, control apparatus 32 calculates target speed signal VU in the luffing direction of boom 9, target speed signal VR in the slewing direction, and target speed signal VW in the feed-in and feed-out direction of sub wire rope 16 in sub winch 15, and executes the process with target value filter F on the target speed signals. Target value filter F suitable for the characteristics of the target speed signal is selected for each target speed signal. Note that here, target speed signal VW is the target speed signal in the feed-in and feed-out direction of sub wire rope 16 in sub winch 15, but, in the case where load W is lifted with main wire rope 14 and main hook 10a in main winch 13, target speed signal VW is the target speed signal in the feed-in and feed-out direction of main wire rope 14 in main winch 13.

Then, control apparatus 32 feed-forward controls crane 1 on the basis of the target speed signal generated for each control section (STEP-103).

With the configuration including control apparatus 32 that implements the above-described control method, crane 1 can automatically convey load W without sway when automatically conveying load W along a path set based on given path information (point group data P(n)).

Control Flow of Second Embodiment

Figure 8B:
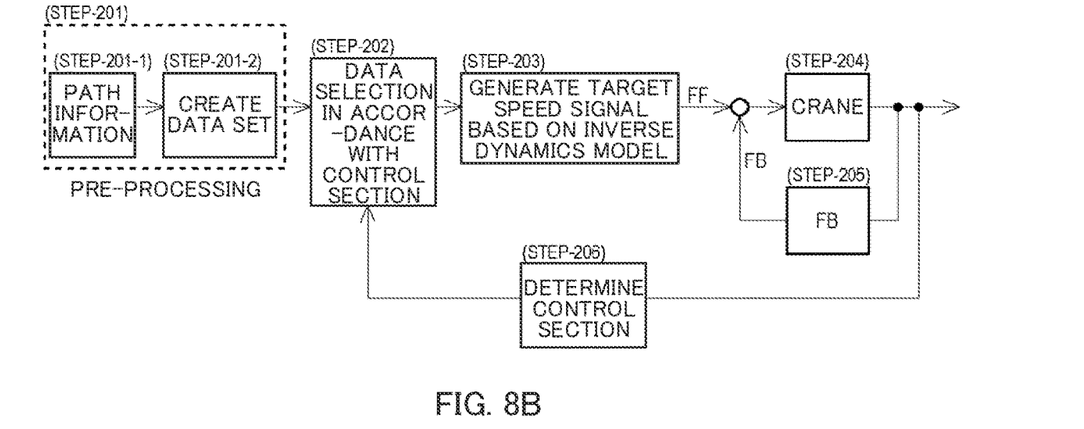

In addition, crane 1 can automatically convey load W in accordance with a control flow according to a second embodiment illustrated in FIG. 8B.

The method of controlling crane 1 according to the second embodiment achieves a more smooth control by preliminarily preparing the above-described target speed signal after conversion.

As illustrated in FIG. 8B, in the method of controlling crane 1 according to the second embodiment, control apparatus 32 performs a pre-process (STEP-201). The pre-process is a process of preliminarily creating data set DS for given path information (point group data P(n)), acid is performed before load W is actually automatically conveyed by crane 1.

In the pre-process (STEP-201), path information (point group data P(n)) is given to control apparatus 32 (STEP-201-1). Control apparatus 32 creates data set DS on the basis of the given path information (STEP-201-2).

With a control section subdivided into a constant-speed section, an acceleration section and a deceleration section as a unit, control apparatus 32 creates data set DS for each control section. Single data set DS includes at least information representing the target conveyance time and information representing the target conveyance speed in that control section, and, information representing target value filter F suitable for that control section. The characteristics of target value filter F included in the same data set DS are taken into consideration for the target conveyance time included in data set DS.

For example, when the path information (point group data P1 to p5) as illustrated in FIG. 5 is given, control apparatus 32 subdivides the path into nine control sections, preliminarily computes nine data set DS, DS1 to DS9, and stores it.

After completing the pre-process (STEP-201), crane 1 starts a control for automatic conveyance of load W by control apparatus 32. When the control of automatic conveyance of load W is started, control apparatus 32 detects the current position of load W from orientation information of crane 1, and determines the control section where the current position of load W is located. Then, control apparatus 32 selects data set DS corresponding to the determined control section (STEP-202). For example, in the example illustrated in FIG. 5, when it is determined that the control section where load W is currently present is the first-a-section, control apparatus 32 selects data set DS1 corresponding to the first-a-section.

Next, control apparatus 32 generates the target speed signal on the basis of selected data set DS1 (STEP-203). At this time, control apparatus 32 generates the target speed signal based on the inverse dynamics model using a target value filter based on the inverse dynamics model as target value filter F. In the case where the control section is the acceleration section or deceleration section, a target speed signal that changes with time in a curved line shape is generated. Alternatively, in the case where the control section is a constant-speed section, a constant target speed signal is generated.

Next, in the first-a-section, control apparatus 32 controls the operation of crane 1 through a feed-forward control on the basis of the generated target speed signal (STEP-204).

Next, control apparatus 32 calculates the difference between the target speed signal and the operation result (actual operation speed) of crane 1, and feeds back the information representing the difference to the generated target speed signal (STEP-205).

In addition, control apparatus 32 detects the position of load W after the operation from the orientation information of crane 1 after the above-mentioned operation, and determines the control section where load W is located after the operation (STEP-206). In addition, in the case where crane 1 includes other means (such as boom camera 96 and GLASS receiver 30) for detecting the location information of load W, the location information of load W may be detected on the basis of the detection result of the means.

Then, control apparatus 32 selects next data set DS (STEP-202) using the determination result of the control section at (STEP-206).

Then, control apparatus 32 repeats the processes of (STEP-202) to (STEP-206) until it is detected that the position of load W matches final node Pn. With this configuration, control apparatus 1 controls the operation of crane 1, and automatically conveys load W from node P1 to node Pn along the set conveyance path.

Crane 1 includes control apparatus 32 that executes the above-described control method, and thus, when load W is automatically conveyed along the set path on the basis of path information (point group data P(n)) using crane 1, crane 1 can automatically convey the load W without sway and can reliably convey load W along the path of the path information (point group data P(n)).

The above-mentioned embodiments are merely representative forms, and can be implemented in various variations to the extent that they do not deviate from the gist of an embodiment. It is of course possible to implement the invention in various forms, and the scope of the invention is indicated by the description of the claims, and further includes all changes within the meaning and scope of the equivalents of the claims.

INDUSTRIAL APPLICABILITY

The present invention is applicable to a crane control method and a crane that is controllable by the control method.

REFERENCE SIGNS LIST

1 Crane
9 Boom
32 Control apparatus
Ti Target conveyance time
Vi Target conveyance speed
VU Target speed signal (of boom luffing direction)
VW Target speed signal (of feed-in and feed-out directions of wire rope)
VR Target speed signal (of boom slewing direction)
W Load
P (n) Point group data
F Target value filter

The invention claimed is:

1. A control apparatus of a crane that automatically conveys a load along a conveyance path given as point group data including at least coordinates of a passing point of the load and a passage order of each passing point, wherein the control apparatus comprises a hardware processor that:
   calculates a target conveyance time of the load in a section and another section adjacent to the section, each of the section and the another section defined by two passing points adjacent to each other in the passage order on the point group data;
   calculates a target speed signal of the load in the section and the another section on a basis of a distance between the two passing points and the target conveyance time that is calculated for each of the section and the another section; and
   converts, into a non-stepwise target speed signal, a stepwise target speed signal connecting the target speed signal of the section and the target speed signal of the another section adjacent to the section through a use of a low-pass filter to control the crane on a basis of the non-stepwise target speed signal.

2. The control apparatus of the crane according to claim 1, wherein the hardware processor further subdivides the section into a plurality of control sections corresponding to any of an acceleration section, a constant-speed section and a deceleration section, on a basis of a transition of a change from the target speed signal of the section to the target speed signal of another section adjacent to the section; and generates the non-stepwise target speed signal by applying the low-pass filter to the target speed signal of the acceleration section and the deceleration section.

3. The control apparatus of the crane according to claim 2, wherein the hardware processor further creates a data set including at least a target conveyance time of the control section and information representing the low-pass filter suitable for the control section.

4. The control apparatus of the crane according to claim 3, wherein the hardware processor further creates the data set before a control of automatically conveying the load is started.

5. The control apparatus of the crane according to claim 2, wherein the hardware processor further sets a result obtained by applying the low-pass filter to the target speed signal of the acceleration section and the deceleration section as a time required for each of the acceleration section and the deceleration section, and sets a time obtained by subtracting the time required for each of the acceleration section and the deceleration section from the target conveyance time as a time of the constant-speed section.

6. The control apparatus of the crane according to claim 2, wherein the hardware processor further calculates a target conveyance speed of the load in the section by dividing a distance between the two passing points by the target conveyance time that is calculated, and calculates the target speed signal on a basis of the target conveyance speed and a crane model of the crane.

7. The control apparatus of the crane according to claim 3, wherein the hardware processor further detects a current position of the load after the crane is operated through a feed forward control using the target speed signal of the load, and determines the control section where the load is currently located on a basis of the current position of the load that is detected, and selects the data set to be used next using the control section where the load is currently located that is determined.

8. The control apparatus of the crane according to claim 1, wherein the low-pass filter is a high-order low-pass filter based on an inverse dynamics model.

9. The control apparatus of the crane according to claim 1, wherein the target speed signal of the load is a signal for making a request to an actuator configured to operate a boom and a wire rope of the crane, and the target speed signal of the load includes a target speed of displacing the boom in a luffing direction, a target speed of displacing the boom in a slewing direction, and a target speed of displacing the wire rope in a feed-in/feed-out direction.

10. A crane comprising the control apparatus according to claim 1.

* * * * *